United States Patent [19]

Rechter et al.

[11] 4,056,398

[45] Nov. 1, 1977

[54] PLASTIC REFRACTORY COMPOSITION SUITABLE FOR PLACEMENT BY VIBRATING AND THE USE THEREOF

[75] Inventors: Harold L. Rechter, Chicago; James R. Haligarda, Oak Forest, both of Ill.

[73] Assignee: Chicago Fire Brick Company, Chicago, Ill.

[21] Appl. No.: 783,271

[22] Filed: Mar. 31, 1977

[51] Int. Cl.² ............................................. C04B 35/10
[52] U.S. Cl. ....................................... 106/65; 106/67; 106/85
[58] Field of Search ............................... 106/65, 67, 85

[56] References Cited

U.S. PATENT DOCUMENTS

| 3,303,034 | 2/1967 | Troell et al. | 106/65 |
| 3,998,648 | 12/1976 | Thrower et al. | 106/67 |

*Primary Examiner*—J. Poer
*Attorney, Agent, or Firm*—Foster York

[57] ABSTRACT

High alumina, phosphate containing refractory plastic composition suitable for placement by mechanical vibration using molding techniques are maximized in density and shelf life while requiring minimum water content for ease of placement through the combining of a relatively low content of bentonite with a small addition of tetrasodium pyrophosphate. The resulting compositions are easy to place by vibration with minimal tendency to slump on removal of forms.

9 Claims, No Drawings

PLASTIC REFRACTORY COMPOSITION SUITABLE FOR PLACEMENT BY VIBRATING AND THE USE THEREOF

This invention relates to improvements in phosphate containing high alumina content refractory compositions, i.e., containing more than 50 percent alumina content, suitable for placement by mechanical vibration, such as for metal melting furnace components and for ladles which carry molten metals. The invention includes the use of such compositions.

Vibration placed refractory plastics must have sufficient water to be able to "move" and for separate pieces to knit together for proper consolidation and elimination of voids. Yet the material must display sufficient stiffness when vibration is completed to permit removal of forms without slumping, and preferably to allow transporting from the forming area to where air setting and/or heat curing will take place. While ease of forming is enhanced by elimination of clay-type plasticizers, the resultant bodies are prone to slump and are not readily prepared as a coherent plastic, the most convenient format for handling. Many ball clays permit forming of good plastic bodies that can be readily formed by vibration, but tend to slump and are not good from a shelf life point of view.

Bentonite is most advantageous for imparting plastic properties to phosphate bonded formulations, as disclosed by Troell et al (U.S. Pat. No. 3,303,034) and Thrower et al (U.S. Pat. No. 3,998,648) since it lends far longer shelf life to products that must retain a high percentage of their workability over a period of months. Too much bentonite in a vibratory formed plastic, however, will be too stiff and require too high a degree of vibration, which is undesirable from a viewpoint of cost, mechanical impact on the surrounding area, and noise level. Too small an amount will not provide sufficient plasticity to form as a plastic and to resist slumping. We have found that a relatively low level of bentonite can be made effective for forming and stiffening by the addition of a small quantity of tetrasodium pyrophosphate (TSPP) without reduction of shelf life.

Our formulations cover the range of 50-95 percent alumina content (dry basis). We may use aggregate bases of calcined clays, crushed fire brick, calcined bauxite, or tabular alumina. Intermediate and fine grain sized components may include calcined and tabular aluminas, calcined bauxite, raw and calcined kyanite, pulverized calcined clay or fire brick, and similarly used materials. Preferably the composition contains −325 mesh alumina or aluminum silicate. The binder is phosphoric acid, 3-12 percent of the 75 percent concentration, or equivalent phosphorous oxide ($P_2O_5$) contents from other concentrations or with use of suspensions of monoaluminum dihydrogen phosphate to give a $P_2O_5$ content equal to that of 75 percent phosphoric acid. Bentonite is preferably the only clay-type component to be used, in a range of 1.2 to 3 percent, although up to one percent of a kaolin clay, preferably large grained, can be incorporated. TSPP may be added in the range of 0.2-1.5 percent, but is preferably at 0.3-0.5 percent for best efficiency of use. About 1 percent of hydrated alumina is desirable as a shelf life aid. The blends are tempered with water to impart a good plastic condition, a workability index of a little over 40 percent based on ASTM standard C181-47. With the required range of bentonite and TSPP, grain sizing is not critical. At least 20 percent should preferably be −325 mesh, and this component should be an alpha or anhydrous alumina or anhydrous aluminum silicate, such as calcined or tabular alumina or calcined clay, for minimum reactivity with phosphoric acid in storage. Overall standard sizing for good density should be employed but it is not critical to our disclosure of the advantages of combining low amounts of bentonite with TSPP.

EXAMPLE I

An example and suitable range in percent by weight of a nominally 85 percent alumina content vibratory plastic is the following:

| | | |
|---|---|---|
| ¼ inch by ⅛ inch calcined bauxite | 10.0 | 0–20 |
| ⅛ inch by fines calcined bauxite | 39.0 | 30–65 |
| −325 mesh calcined alumina | 31.0 | 20–45 |
| −100 mesh raw kyanite | 10.0 | 0–15 |
| −200 mesh Western bentonite | 1.6 | 1.2–3 |
| 75% phosphoric acid | 7.0 | 3–12 |
| −325 mesh hydrated alumina | 1.0 | 0–2 |
| TSPP | 0.4 | 0.2–1.5 |

Sufficient water was added to give a moisture content of 7.5 percent as measured by an infrared lamp on an Ohaus Moisture Determination Balance. Worability index was in excess of 40 percent. This material could be mulled and extruded, packaged as a sliced plastic in cartons. Slices were separated and placed in a vibrating form for a ladle. It densified readily on vibration, using a Martin pneumatic "Brute" Model CC V6 vibrator attached to the central form with air pressure of 64–100 psi. On releasing the greased form, the material forming the ladle lining did not slump.

EXAMPLE II

An example and suitable range in percent by weight of a nominally 55 percent alumina content vibrating-type plastic is the following:

| | | |
|---|---|---|
| ¼ × ⅛ inch calcined bauxite clay (47% $Al_2O_3$) | 14.0 | 0–20 |
| ⅛ inch by fines calcined bauxite clay | 32.0 | 30–65 |
| −325 mesh calcined alumina | 21.6 | 20–45 |
| −100 mesh raw kyanite | 11.0 | 0–15 |
| −200 mesh Western bentonite | 2.0 | 1.2–3 |
| Pulverized fire brick | 11.0 | 0–20 |
| 75% phosphoric acid | 7.0 | 3–12 |
| −325 mesh hydrated alumina | 1.0 | 0–2 |
| TSPP | 0.4 | 0.2–1.5 |

This blend was tempered with sufficient water for a good plastic body, such as, for example, about 7 percent moisture as measured on an Ohaus Moisture Determination Balance using an infrared lamp. This material was tested as described in Example I.

All percentages are in percent by weight and the size grading or mesh indications are according to the Tyler series. Size in inches is the average diameter of the particles. Calcined alumina and tabular alumina may be classified as an alpha alumina. The term "alumina content" includes materials such as clay and bauxite which have an $Al_2O_3$ content, as well as including $Al_2O_3$ itself.

We claim:

1. A plastic refractory composition suitable for placement by mechanical vibration comprising in percent by weight on a dry basis:

| | % |
|---|---|
| -325 mesh alumina or aluminum silicate | 20–45 |
| Phosphoric acid or water soluble phosphate to give a P₂O₅ content equal to 75% phosphoric acid | 3–12 |
| Bentonite | 1.2–3 |
| Kaolin clay | 0–1 |
| Tetrasodium pyrophosphate | 0.2–1.5 |
| Alumina or aluminum silicate aggregates, ¼ inch maximum size | balance. |

2. The composition in accordance with claim 1 in which water is present in sufficient amount to give a plastic composition.

3. A composition in accordance with claim 1 comprising in approximate percent by weight

| | % |
|---|---|
| -¼ inch diameter calcined bauxite | 0–20 |
| -⅛ inch calcined bauxite | 30–65 |
| -325 mesh calcined alumina | 20–45 |
| -100 mesh raw kyanite | 0–15 |
| -200 sodium bentonite | 1.2–3 |
| 75% phosphoric acid | 3–12 |
| -325 mesh hydrated alumina | 0–2 |
| Tetrasodium pyrophosphate | 0.2–1.5. |

4. A composition in accordance with claim 2 comprising in approximate percent by weight

| | % |
|---|---|
| ⅛ to ¼ inch calcined bauxite clay of about 47% Al₂O₃ content | 0–20 |
| ⅛ inch by fines calcined bauxite clay | 30–65 |
| −325 mesh calcined alumina | 20–45 |
| −100 mesh raw kyanite | 0–15 |
| −200 Western (sodium) bentonite | 1.2–3 |
| Pulverized fire brick | 0–20 |
| 75% phosphoric acid | 3–12 |
| −325 mesh hydrated alumina | 0–2 |
| Tetrasodium pyrophosphate | 0.2–1.5 |
| and water in sufficient amount to produce a plastic composition. | |

5. In a method of vibration placement of a composition comprising 50–95 percent alumina content refractory and a phosphate bonding agent, the improvement wherein the composition that is vibrated includes 1.2–3 percent bentonite and at least 0.2 percent tetrasodium pyrophosphate.

6. The method of vibration placement of a refractory composition for furnaces, ladles and the like which comprises placing in the desired place and vibrating a composition comprising in percent by weight on a dry basis:

| | % |
|---|---|
| -325 mesh alumina or aluminum silicate | 20–45 |
| Phosphoric acid or water soluble phosphate to give a P₂O₅ content equal to 75% phosphoric acid | 3–12 |
| Bentonite | 1.2–3 |
| Kaolin clay | 0–1 |
| Tetrasodium pyrophosphate | 0.2–1.5 |
| Alumina or aluminum silicate aggregate, ¼ inch maximum size | balance. |

7. The method in accordance with claim 6 wherein the composition comprises in approximate percent by weight

| | % |
|---|---|
| -¼ inch diameter calcined bauxite | 0–20 |
| -⅛ inch calcined bauxite | 30–65 |
| -325 mesh calcined alumina | 20–45 |
| -100 mesh raw kyanite | 0–15 |
| -200 sodium bentonite | 1.2–3 |
| 75% phosphoric acid | 3–12 |
| -325 mesh hydrated alumina | 0–2 |
| Tetrasodium pyrophosphate | 0.2–1.5. |

8. The method in accordance with claim 7 wherein the composition comprises in approximate percent by weight:

| | % |
|---|---|
| ⅛ to ¼ inch calcined bauxite clay of about 47% Al₂O₃ content | 0–20 |
| ⅛ inch by fines calcined bauxite clay | 30–65 |
| −325 mesh calcined alumina | 20–45 |
| −100 mesh raw kyanite | 0–15 |
| −200 Western (sodium) bentonite | 1.2–3 |
| Pulverized fire brick | 0–20 |
| 75% phosphoric acid | 3–12 |
| −325 mesh hydrated alumina | 0–2 |
| Tetrasodium pyrophosphate | 0.2–1.5 |
| and water in sufficient amount to produce a plastic composition. | |

9. The method in accordance with claim 7 wherein water is also present in sufficient amount to give a plastic composition.

* * * * *